United States Patent [19]

Beecher

[11] 4,272,153
[45] Jun. 9, 1981

[54] BINOCULAR WITH NOVEL ARRANGEMENT OF HINGE MEANS BETWEEN THE TELESCOPES THEREOF

[76] Inventor: William J. Beecher, 1960 Lincoln Park West, Chicago, Ill. 60614

[21] Appl. No.: 929,578

[22] Filed: Jul. 31, 1978

[51] Int. Cl.³ .......................... G02B 23/02; G02B 7/06
[52] U.S. Cl. .......................................... 350/36; 350/75
[58] Field of Search ....................... 350/36, 75, 76, 77, 350/72; D16/62, 59

[56] References Cited

U.S. PATENT DOCUMENTS

| 1,016,315 | 2/1912 | Barton | 350/36 |
|---|---|---|---|
| 1,397,156 | 11/1921 | Baumann | 350/36 |
| 2,079,890 | 5/1937 | Wollensar et al. | 350/75 |
| 2,328,603 | 9/1943 | Bennett et al. | 350/36 |
| 2,424,283 | 7/1947 | Miles | 350/36 |
| 2,710,560 | 6/1955 | Thompson | 350/72 |
| 3,788,727 | 1/1974 | Abe | 350/36 |
| 3,985,421 | 10/1976 | Beecher | 350/36 |

Primary Examiner—Jon W. Henry
Attorney, Agent, or Firm—Gerlach, O'Brien & Kleinke

[57] ABSTRACT

A binocular wherein each telescope embodies a porro arrangement of mirrors within a shell and includes eyepiece and objective barrels. The objective regions of the telescope shells are hingedly connected together so that the interpupillary distance between the eyepiece barrels may be adjusted as desired, and the position of the hinge connection is such that the objective barrels are offset inwardly from the eyepiece barrels in any angular or adjusted position of the telescopes and to such an extent that no part of the binocular is projected in any manner into the rim region of the field of view when the binocular is put to use.

2 Claims, 7 Drawing Figures

BINOCULAR WITH NOVEL ARRANGEMENT OF HINGE MEANS BETWEEN THE TELESCOPES THEREOF

The present invention relates generally to a binocular of the type which is shown and described in my U.S. Pat. No. 3,985,421, granted on Oct. 12, 1976, and entitled "BINOCULAR HAVING SMALL SIZE, LIGHTWEIGHT, AND HIGH PERFORMANCE CHARACTERISTICS."

The binocular of such U.S. Pat. No. 3,985,421 was designed, insofar as possible, to be as inobstrusive as possible by disappearing before the eyes of the user when in use for viewing purposes, especially when worn as spectacles, and toward this end, the two side-by-side telescopes thereof which embody porro arrangements of horseshoe-shaped mirrors within their respective shells, had extremely thin, almost rimless, eyepiece barrels and also larger relatively bulky, inwardly offset objective barrels which were disposed for the most part inwardly of the eyepiece barrels. With a binocular of this character, the thin-walled eyepiece barrels, by reason of their being inconspicuous, out of focus, and peripheral, are ordinarily ignored by the eyes of the user with the result that the lenses of such barrels, which extend coextensively around the insides of the barrel walls, provide a single, circular, rimless, magnified field. This field is surrounded by the normal peripheral vision of the binocular user or viewer and largely eliminates the usual dark framing circle which is prevalent with most binoculars. However, the dark framing ring is not completely eliminated because at the top of the field of view there is present an obstruction in the form of the dark mass of the objective portion of the binocular.

Broadly speaking, the particular binocular of the present invention is designed as an improvement over that of my U.S. Pat. No. 3,985,421 and, in short, it involves a transposition of the binocular telescopes, one from right to left and the other from left to right. Such transposition of telescopes is effected by a rearrangement of the hinge structure which connects the objective portions of the shells of the two telescopes, the hinge structure being applied to each shell 180° from its former positioning so that no appreciable portions of the telescope shells directly overlie the eyepiece barrels.

This novel rearrangement of telescopes attains a structure wherein the right angle spaces which are formed as the result of the axes of the upper and lower generally frusto-conical tubular portions of the telescope shells being positioned at right angles to one another, open or face laterally away from each other rather than toward each other as is the case in connection with the binocular of my U.S. Pat. No. 3,985,421 wherein the apices of such right angle spaces are directed towards one another. By thus rearranging the telescopes from left to right and vice versa, the user of the binocular sees only the circular magnified field, minus any framing circle or portion thereof, such circular magnified field being surrounded only by the normal peripheral vision of the user which extends peripherally radially outwardly in all directions.

In the ensuing description of the invention, it may be helpful to bear in mind that in connection with binocular viewing, the nose of the user unquestionably protrudes into the visual field, but this blind spot causes no problem with binocular vision, biologically speaking, by reason of the fact that the left eye sees details to the left side of the binocular field which, because of the intrusion of the nose, the right eye fails to perceive, and vice versa. In such a case, the right eye simply ignores the left side detail as well as the nose which stands in the way. It is ignored subjectively in the same manner that a cross-eyed individual must ignore one image in order to see the field without strain.

The provision of a binocular such as has briefly been outlined above, possessing the stated advantages and involving for all intents and purposes the disappearance of the binocular before the eyes of the viewer (when it is worn as spectacles) by taking advantage of the aforementioned subjective blind spot, constitutes the principal object of the present invention.

Numerous other objects and advantages of the invention not at this time enumerated will readily suggest themselves as the nature of the invention is better understood from a consideration of the following detailed description.

The invention consists of the several novel features which are hereinafter set forth and are more particularly defined by the claims at the conclusion hereof.

In the accompanying two sheets of drawings forming a part of this specification, one illustrative embodiment of the invention is shown.

Figure 7:
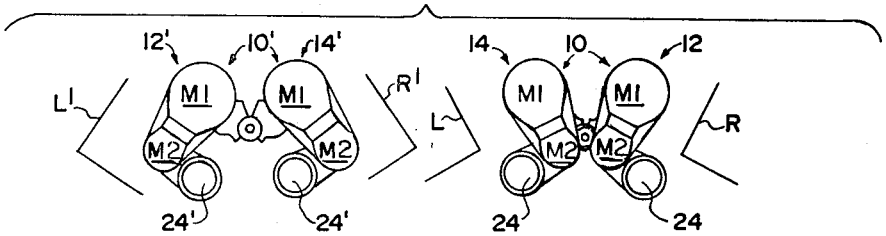

FIG. 7 is a comparative structural view, almost entirely schematic in its representation, illustrating the difference in the hinge and telescope arrangements between the binocular of my U.S. Pat. No. 3,985,421 and that constituting the present invention.

Referring now to the drawings in detail and in particular to FIGS. 1 to 6, inclusive, these views illustrate in a somewhat schematic fashion the external configuration of a binocular embodying the principles of the present invention, such binocular being identified by the reference numeral 10. Generally speaking, the binocular 10 is comprised of two, side-by-side, counterpart telescopes 12 and 14, the telescope 12 being designed for viewing cooperation with the user's right eye and the telescope 14 being designed for viewing cooperation with the user's left eye. In the following description, as well as in the appended claims, reference to the binocular 10, insofar as is practicable, will be made on the basis of the position which it assumes in FIG. 1, that part of the binocular which includes the eyepiece barrels 16 being considered as the front of the binocular, while that part which includes the objective barrels 18 being considered as the rear of the binocular. In such figure, the binocular is shown in its horizontal viewing position with the two tubular eyepiece barrels 16 and the two tubular objective barrels 18 extending horizontally and with the eyepiece barrels being disposed in a horizontal plane below that of the objective barrels. Furthermore, since the two telescopes 12 and 14 are substantially identical except insofar as they are complementary structures and differ from each other only by the use of components which are "mirror complements," a description of one telescope will suffice for the other.

Insofar as the telescopes 12 and 14 per se are concerned, such telescopes are substantially identical with the telescopes which are shown and described in my aforementioned U.S. Pat. No. 3,985,421 and, for a full understanding of the nature of such telescopes, including the arrangement of certain eyepiece barrels, objective barrels, and the associated porro-one type of mirror system, reference may be had to such patent, the entire disclosure of which insofar as it is consistent with the present disclosure, is hereby made a part of the present application.

The two telescopes 12 and 14 are connected together by a hinge connection 20 which is effective between the two objective barrels 18, such hinge connection being structurally similar to the hinge structure which is shown and described in my above referred to patent. Said hinge connection 20 is associated with the objective barrels 18 in a novel manner whereby the two telescopes or binocular halves 12 and 14 become transposed positionally from the relative positions which they assume in my patented binocular structure in a manner and for a purpose that will now be set forth in detail.

In connection with my earlier binocular structure, the binocular was designed with thin-walled telescope shells enclosing mirrors in porro fashion and so positioned as to maintain the relatively bulky objective lenses inwardly, i.e., toward the nose of the user insofar as practical, not only to achieve greater compactness but also so that the peripherally located thin-walled shells of the eyepiece barrels would be inconspicuous and out of focus and, therefore, ignored by the user who would encounter a substantially rimless magnified field of view. This field was surrounded by the normal peripheral vision of the user without a dark framing ring such as is prevalent in practically all other binoculars regardless of whether they are of the prism or mirror type. The arrangement or design of my prior binocular proved to be effective to block out any view of the instrument itself when in use with the single exception that the dark mass of the objectives remained visible at the top of the visual field.

According to the present invention and with particular reference to FIG. 7 which will again be referred to when the nature of the present invention is better understood, the binocular halves or telescopes 12 and 14 as shown at the right side of such view are reversed positionally with respect to the binocular telescopes 12' and 14' which are shown at the left side of this view, such latter telescopes corresponding to those of my prior binocular structure as disclosed in said U.S. Pat. No. 3,985,421. Not only are the telescopes 12 and 14 positionally reversed, but also they are differently oriented so as to maintain the proper interpupillary distance between the eyepiece barrels 16, all in a manner that will be fully set forth subsequently.

Referring again to FIGS. 1 to 6, inclusive, inasmuch as it has previously been pointed out that each telescope 12 and 14 of the binocular 10 is substantially identical with the telescopes of my earlier binocular as disclosed in my aforementioned U.S. Pat. No. 3,985,421 only a very brief description of the present telescopes will be set forth herein. The telescope 14, in addition to its tubular eyepiece barrel 16 and tubular objective barrel 18, embodies a porro arrangement of mirrors M1, M2, M3 and M4. These mirrors are all enclosed within the telescope shell 22 and each mirror is preferably of horseshoe shape. The shell 22 of the telescope 14 as shown in the drawings embodies upper and lower generally frusto-conical shell portions which have their axes positioned at a right angle to each other in order to define therebetween a right angle space, and are arranged with the small base of the upper shell portion intersecting the small base of the lower shell portion in offset relationship. The large base of each shell portion has extending thereacross one of the mirrors with one section of its rim straight, and the small base of each shell portion likewise has extending thereacross a similar or corresponding planar mirror with one section of its rim straight. The planes of the mirrors at the large bases of the shell portions extend at an angle of approximately 45° to each other, and the planes of the mirrors at the opposite ends of each shell portion extend at a right angle to each other. The straight rim sections of the mirrors at the ends of the upper shell portion are disposed in close opposed parallel relation, and the straight rim sections of the mirrors at the ends of the lower shell portion are disposed in close opposed parallel relation and positioned apart a distance substantially greater than the distance between the straight rim sections of the mirrors at the ends of the upper shell portion. The large base of the upper shell portion is provided with a circular objective aperture in opposed and nearly touching relation with the adjacent mirror therein. The large base of the lower shell portion is provided with a circular eyepiece aperture in opposed and nearly touching relation with the adjacent mirror therein. The planes of the objective and eyepiece apertures extend at an angle of 45° to the plane of the adjacent mirror and are in comparatively close parallelism. The porro arrangement of mirrors is such that the mirrors M3 and M4 are arranged at right angles to each other in the eyepiece portion of the shell 22, the mirrors M1 and M2 are arranged at right angles to each other in the objective portion of said shell 22, while the mirrors M2 and M3 are arranged in parallelism. Light entering the objective barrel 18 strikes the mirrors M1, M2, M3 and M4 successively and in the order named and leaves the shell 22 through the front end of the eyepiece barrel 16 where it is intercepted by the eye of the user. Eyepiece lenses 24 and objective lenses 26 are disposed respectively in the barrels 16 and 18.

It is to be noted at this point that in the several views of the drawings, the actual mirror surfaces do not appear since they are enclosed within the binocular shell 22. Therefore, in order to identify them by the reference characters M1, M2, M3 and M4, the lead lines extending from these reference characters extend only to the general planes of such mirrors when such planes are in exposed positions. When the planes of the horseshoe-shaped mirrors are not actually exposed, the lead lines extend to dotted-line disclosures of the planes or to certain edges of the mirror outlines.

Figure 2:
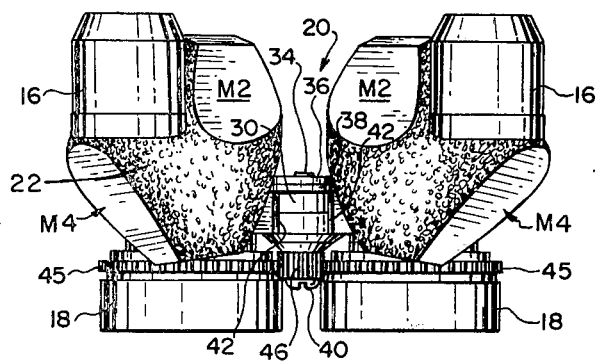
FIG. 2 is a bottom plan view of the binocular.
Figure 3:
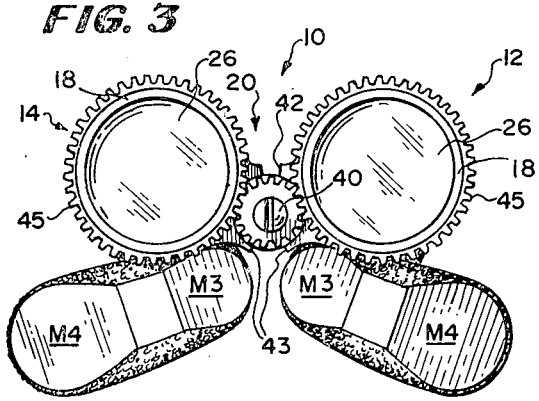
FIG. 3 is a rear elevational view of the binocular.
Figure 4:
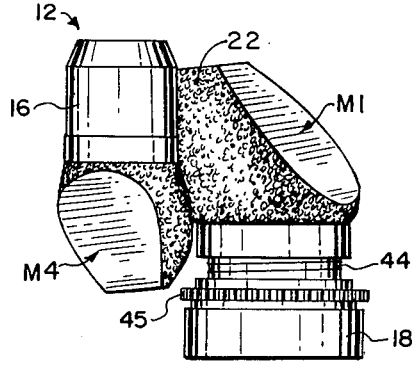
FIG. 4 is a right side elevational view of the binocular.
Figure 5:
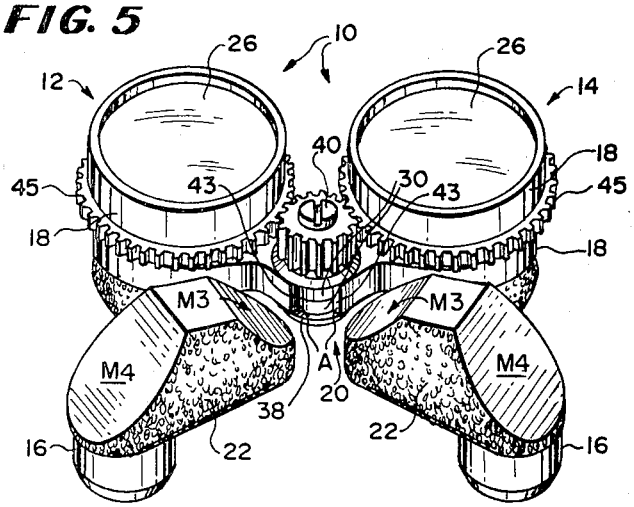
FIG. 5 is an underneath rear perspective view of the binocular.
Figure 6:
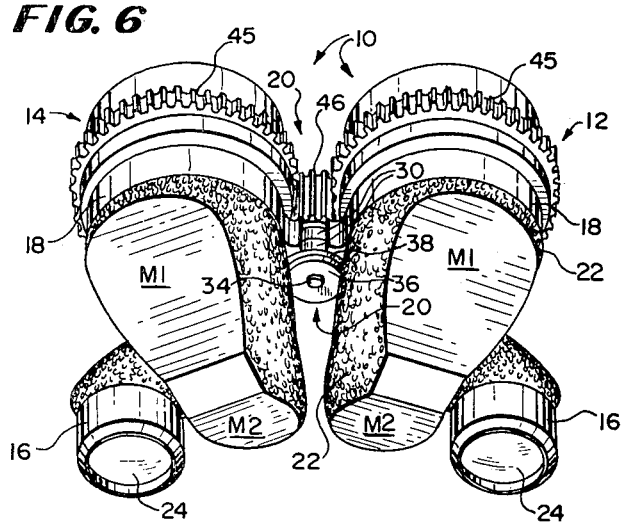
FIG. 6 is a top front perspective view of the binocular.

Considering now the nature of the hinge connection 20, this connection is fully disclosed in my aforementioned U.S. Pat. No. 3,985,421, and briefly it embodies a pair of complementary hinge lugs 30 which are formed on the telescope shells 22 in the vicinity of the objective barrels 18 and overlap each other as best shown in FIGS. 2 and 6 of the drawings. The lugs are provided with coaxial bores which receive therethrough a hinge pin 34 by means of which the two shells 22 are hingedly connected together. The rear end of the hinge pin is provided with a radial flange 36 while a friction washer 38 is interposed between the flange 36 and the adjacent side face of the adjacent hinge lug 30 and restrains freedom of bending or hinging movement between the two binocular halves or telescopes 12 and 14, it being necessary manually to force such telescopes in order to attain the desired interpupillary adjustment. A clamping screw 40 is threadedly receive in the front end of the hinge pin and serves to regulate the pressure between the two hinge lugs 30. Upper and lower stop shoulders 42 and 43 (see FIG. 3) on the hinge lugs 30 determine the maximum and minimum interpupillary adjustment of the two telescopes 12 and 14 of the binocular 10 and permit limited upward and downward swinging movement of the two telescopes for lateral adjustment of the lens-containing eyepiece barrels when the binocular is in normal use. The hinge connection 20 between the two telescopes is connected to and extends between the opposed inner portions of the shells 22 of the telescopes. As best shown in the right-hand view of FIG. 7 of the drawings, the hinge connection 20 is located in substantial lateral alignment with the apices of the aforementioned right-angle spaces formed or subtended by the axes of the upper and lower generally frusto-conical tubular portions of the shells 22. The axes of such shell portions and the hinge connection 20 together have the general configuration of the letter "X" when viewed from the front.

As is the case in connection with my prior binocular structure, means are provided for effecting center focusing of the two counterpart telescopes 12 and 14. Such means embodies threaded connections 44 (see FIG. 4) between the objective barrels 18 and the binocular shell 22, together with slip ring gears 45 on the barrels 18, such ring gears meshing with a common idler pinion 46, all in a manner which is set forth in my aforementioned U.S. Pat. No. 3,985,421. Collective center focusing may be accomplished by rotating either objective barrel 16 and thus transmitting motion through the medium of the pinion 46 to the other objective barrel. Individual focusing is accomplished by restraining rotation of either objective barrel while rotating the other barrel in an appropriate direction, likewise as disclosed in my prior patent application.

Figure 1:
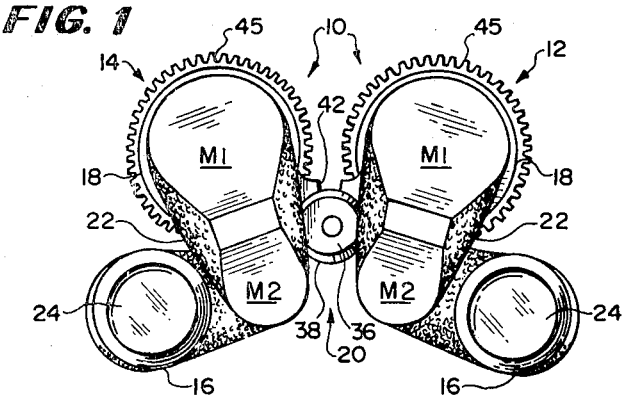
FIG. 1 is a front elevational view, somewhat schematic in its representation, of a binocular embodying the principles of the present invention, such view illustrating the binocular in the operative viewing position in which it is held by the user.

Considering now FIG. 1 of the drawings in conjunction with FIG. 7, it will be observed that the right angle spaces which are subtended by the axes of the upper and lower generally frusto-conical tubular portions of the shells 22 of the present binocular 10 open or face laterally away from each other as indicated by the right angles which are labelled L and R on opposite sides of the right-hand illustration of FIG. 7. It will also be observed by viewing the right-hand illustration of FIG. 7 that the apices of the aforementioned right angle spaces are directed towards one another. Such right angle spaces may be considered in a rough manner of speaking as being defined by two lines, one of which extends between the mid-points of the mirrors M1 and M2 and the other of which extends between the midpoints of the mirrors M3 and M4. This outward and upward opening of the right angles just referred to may be distinguished from the two pairs of mirrors of the binocular of my aforementioned U.S. Pat. No. 3,985,421 by reference to the left-hand illustration of FIG. 7 wherein it will be seen that the corresponding right angle spaces which are defined by the corresponding pairs of mirrors open inwardly and downwardly toward each other. In this latter illustration or view, it is apparent that, in connection with each of the eyepiece barrels, such portion of the associated telescope shell as houses the mirrors that correspond to the present mirrors M2 and M3 lies above the eyepiece barrel. The two eyepiece barrels are thus connected by an inverted generally U-shaped bridge when both telescope shells are considered. According to the present invention and as seen at the right-hand of FIG. 7, the spaces immediately above the eyepiece barrels 16 are "empty," which is to say that no portions of the binocular shells 22 lie above the eyepiece barrels 16. Stated otherwise, said eyepiece barrels 16 stand apart separately at the outermost lateral extremities of the binocular as a whole. Such an arrangement results in the complete disappearance of the previously discussed dark mass. The viewer or user of the present binocular 10 sees only the magnified circular field minus any dark framing mass or ring, such field being surrounded by his normal vision which extends peripherally in all directions without limit.

When the present binocular is constructed with relatively small objective lenses 26, as, for example, in the case of $7 \times 25$ or $8 \times 30$ sizes, the objective barrels are sufficiently small that they lie well within the marginal confines of the eyepiece barrels 16, but where more massive objective barrels such as are used in the $7 \times 50$ size are concerned, the larger objective barrels actually do lie above and even slightly outwards of the eyepiece barrels 16. With such binoculars constructed according to the present invention, a slight appearance of a dark mass may become visible in the $7 \times 50$ version. However, such objective masses are so far above the eyepiece barrels 16 that they appear to separate from the normal field of the binocular and "float" above such field. The cut-off point of the separation is the narrow "waist" of the binocular shell which is formed at the apices of the right angles L and R at the right side of FIG. 7. With a $7 \times 50$ binocular, the right angles may open outwardly rather than upwardly, but they never open inwardly or downwardly as shown by the right angles R' and L' of FIG. 7.

The invention is not to be limited to the exact arrangement of parts shown in the accompanying drawings or described in this specification as various changes in the details of construction may be resorted to without departing from the spirit or scope of the invention. For example, although the invention has been shown and described herein in connection with a binocular of the type which employs mirrors arranged in porro fashion, the invention is readily applicable to binoculars which employ porro-arranged prisms which invariably are constructed with shells that resemble the binocular shells which are shown at the left side of FIG. 7 of the drawings. Binoculars of this type, whether they be prism or mirror binoculars, will obtain the herein outlined advantages by rearranging the hinge structures thereof with respect to their objective barrels, the rearrangement thereof in the present instance residing in the positioning of the hinge lugs 30 circumferentially around the object barrels throughout angles of approximately 180°. Therefore, only insofar as the invention is particularly pointed out in the accompanying claims is the same to be limited.

Having thus described the invention what I claim as new and desire to secure by letters patent is:

1. A binocular comprising two side-by-side telescopes connected together by hinge means in order that they may be swung toward and away from each other for binocular adjusting purposes, each telescope embodying a shell having upper and lower generally frusto-conical tubular shell portions which have their axes positioned at a right angle to each other in order to subtend a right angle space, and which are arranged with the small base of the upper shell portion intersecting the small base of the lower shell portion having extending thereacross a planar mirror with one section of its rim straight, the small base of each shell portion likewise having extending thereacross a similar planar mirror with one section of its rim straight, the planes of the mirrors at the large bases of the shell portions extending at an angle of approximately 45° to each other, the planes of the mirrors at the small ends of the shell portions extending at a right angle to each other, the mirrors at the small bases of the shell portions having the sections of the rims thereof that are opposite to the straight sections positioned in close proximity to one another, the straight rim sections of the mirrors at the ends of the upper shell portion being disposed in close opposed parallel relation, the straight rim sections of the mirrors at the ends of the lower shell portion being disposed in close opposed parallel relation and positioned apart a distance substantially greater than the distance between the straight rim sections of the mirrors at the ends of the upper shell portion, the large base of the upper shell portion being provided with a circular objective aperture in opposed and nearly touching relation with the adjacent mirror therein, the large base of the lower shell portion being provided with a circular eyepiece aperture in opposed and nearly touching relation with the adjacent mirror therein, the planes of the objective and eyepiece apertures extending each at an angle of approximately 45° to the plane of the adjacent mirror, and being in comparatively close parallelism, a lens-containing objective barrel seated within said objective aperture and extending alongside one pair of right angularly disposed mirrors, and a lens-containing eyepiece barrel seated within the eyepiece aperture and extending alongside of another pair of right angularly disposed mirrors, the upper and lower shell portions of each telescope being of such size or proportion that the mirrors at the small bases thereof are disposed without overlap in the direction of the line of sight and the mirrors at their large bases overlap only slightly in the direction of the line of sight in order that the linear distance between the outer remote surfaces of the eyepiece and objective lens of each telescope is less than one-half the extreme width of the binocular when the two telescopes are swung apart to their fullest extent, the four mirrors of each telescope being arranged in Porro-type relation, said telescopes being positioned so that the right angle spaces which are subtended by the axes of the generally frusto-conical tubular shell portions of the two telescopes face laterally away from each other, and the apices of said right angle spaces are directed towards each other, said hinge means being connected to and extending between the opposed inner portions of the shells of the telescopes, and being located in substantial lateral alignment with the apices of said right angle spaces, said hinge means including two pairs of opposed shoulders which are designed for abutment with each other so as to permit but limited up and down swinging movement of the two telescopes for lateral adjustment of the lens-containing eyepiece barrels when the binocular is in normal use, said axes of said shell portions and said hinge means together having the general configuration of the letter "X" when viewed from the front.

2. A binocular comprising two side-by-side telescopes connected together by hinge means in order that they may be swung toward and away from each other for binocular adjusting purposes, each telescope embodying a shell having upper and lower generally frusto-conical tubular shell portions having their axes positioned at right angles to each other in order to subtend a right angle space, and which are arranged with the small base of the upper shell portion intersecting the small base of the lower shell portion in offset relationship, the large base of each shell portion having extending thereacross a planar mirror embodying a first rim section and a diametrically opposite second rim section, the small base of each shell portion likewise having extending thereacross a similar planar mirror embodying a first rim section and a diametrically opposite second rim section, the planes of the mirrors at the large bases of the shell portions extending at an angle of approximately 45° to each other, the planes of the mirrors at the small bases of the shell portions extending at a right angle to each other, the mirrors at the small bases of the shell portions having the second rim sections thereof positioned in close proximity to one another, the first rim sections of the mirrors at the ends of the upper shell portion being disposed in close opposed relation, the first rim sections of the mirrors at the ends of the lower shell portion being disposed in close opposed relation and positioned apart a distance substantially greater than the distance between the first rim sections of the mirrors at the ends of the upper shell portion, the large base of the upper shell portion being provided with a circular objective aperture in opposed and nearly touching relation with the adjacent mirror therein, the large base of the lower shell portion being provided with a circular eyepiece aperture in opposed and nearly touching relation with the adjacent mirror therein, the planes of the objective and eyepiece apertures extending each at an angle of approximately 45° to the plane of the adjacent mirror, and being in comparatively close parallelism, a lens-containing objective barrel seated within said objective aperture and extending alongside one pair of right angularly disposed mirrors, and a lens-containing eyepiece barrel seated within the eyepiece aperture and extending alongside of another pair of right angularly disposed mirrors, the upper and lower shell portions of each telescope being of such size or proportion that the mirrors at the small bases thereof are disposed without overlap in the direction of the line of sight and the mirrors at their large bases overlap only slightly in the direction of the line of sight in order that the linear distance between the outer remote surfaces of the eyepiece and objective lens of each telescope is less than one-half the extreme width of the binocular when the two telescopes are swung apart to their fullest extent, the four mirrors of each telescope being arranged in Porro-type relation, said telescopes being positioned so that the right angle spaces which are subtended by the axes of the generally frusto-conical tubular shell portions of the two telescopes face laterally away from each other, and the apices of said right angle spaces are directed towards each other, said hinge means being connected to and extending between the opposed inner portions of the shells of the telescopes, and being located in substantial lateral alignment with the apices of said right angle spaces, said hinge means including two pairs of opposed shoulders which are designed for abutment with each other so as to permit but limited up and down swinging movement of the two telescopes for lateral adjustment of the lens-containing eyepiece barrels when the binocular is in normal use, said axes of said shell portions and said hinge means together having the general configuration of the letter "X" when viewed from the front.

* * * * *